United States Patent

Magori et al.

Patent Number: 5,436,631
Date of Patent: Jul. 25, 1995

[54] SYSTEM FOR TARGETED BRAKING OF VEHICLES

[75] Inventors: Valentin Magori; Wolf-Eckhart Bulst, both of Munich, Germany

[73] Assignee: Siemens Aktiengesellschaft, Munich, Germany

[21] Appl. No.: 207,162

[22] Filed: Mar. 8, 1994

[30] Foreign Application Priority Data

Mar. 31, 1993 [DE] Germany ............ 43 10 610.2

[51] Int. Cl.⁶ ............................................. B61L 3/02
[52] U.S. Cl. ........................................ 342/42; 342/71; 246/182 R; 246/182 C
[58] Field of Search ........... 246/182 R, 182 A, 182 B, 246/182 C, 187 B; 342/42, 43, 44, 70, 71

[56] References Cited

U.S. PATENT DOCUMENTS

| | | | |
|---|---|---|---|
| 4,027,840 | 6/1977 | Blair | 246/122 R |
| 4,096,477 | 6/1978 | Epstein et al. | 342/42 |
| 4,983,984 | 1/1991 | Shibano et al. | |
| 5,294,081 | 3/1994 | Malon | 246/182 R |

FOREIGN PATENT DOCUMENTS

| | | |
|---|---|---|
| 2632902 | 1/1978 | Germany . |
| 2942933 | 5/1981 | Germany . |
| 3043461 | 7/1982 | Germany . |
| 3345707 | 6/1985 | Germany . |
| 3438051 | 4/1986 | Germany . |
| 3700873 | 7/1987 | Germany . |
| 3832409 | 6/1989 | Germany . |
| 3821215 | 12/1989 | Germany . |
| 3828447 | 3/1990 | Germany . |
| 4012668 | 10/1991 | Germany . |
| 4117157 | 3/1993 | Germany . |
| 2093593 | 9/1982 | United Kingdom . |
| WO92/22450 | 12/1992 | WIPO . |

*Primary Examiner*—Mark Hellner
*Attorney, Agent, or Firm*—Hill, Steadman & Simpson

[57] ABSTRACT

A system for identifying momentary location and the momentary velocity of, in particular, a rail-bound vehicle, has a transmission/evaluation unit having an antenna for emitting a high-frequency pulse and for receiving a reflected pulse reply signal. Surface wave identification marks having individual coding are arranged at intervals from one another in an area of and along a prescribed travel path of the vehicle. The mutual phase shift of at least two pulse reply signals can be measured as a Doppler shift and the travel velocity can be calculated therefrom via the relative velocity with pulse interrogations of an identification mark following one another at least twice at a predetermined location before/after traversing a specific identification mark. The point in time change in operational sign of the Doppler shift is acquired for this identification mark, and is the point in time of traversal of the location of the specific identification mark.

5 Claims, 3 Drawing Sheets

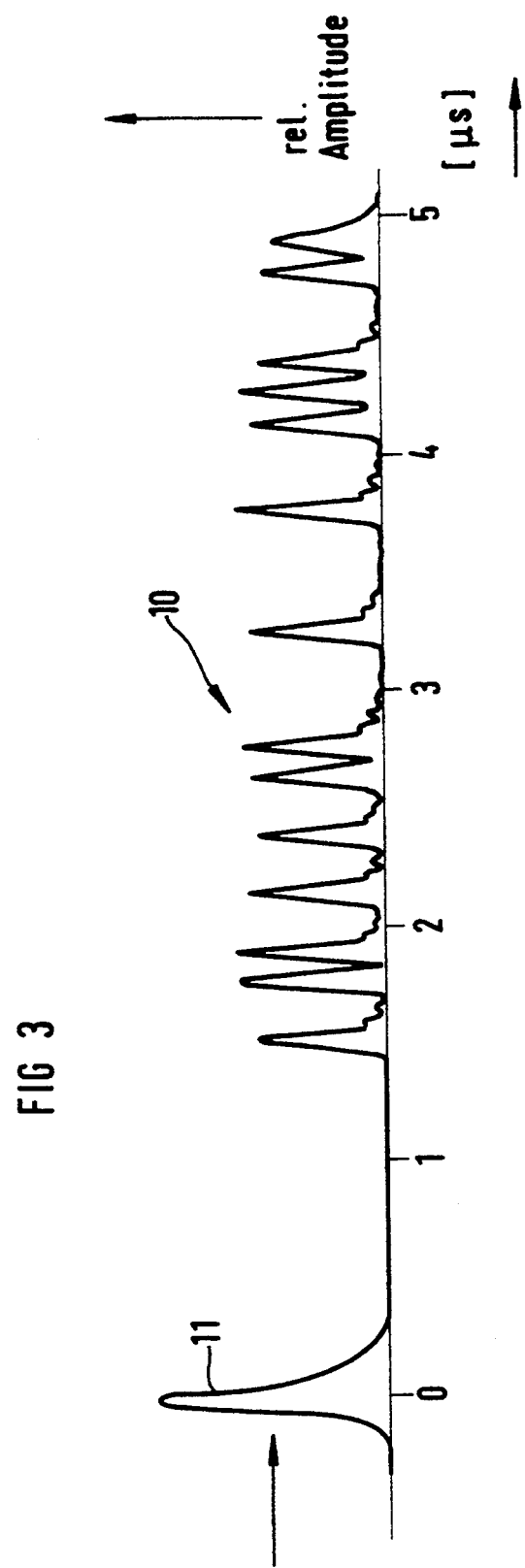

SYSTEM FOR TARGETED BRAKING OF VEHICLES

BACKGROUND OF THE INVENTION

The present invention is directed to a system for targeted braking of vehicles, such as railroad trains.

It is desirable or even necessary, particularly for the automatic operation of vehicles such as railroad trains, that the vehicles come to a stop at a precise point at loading stations and the like in railroad stations. This exact stopping should be achieved from full speed insofar as possible, that is, it need not be obtainable by slowly creeping to the stopping point. Such an exactly targeted stopping in railroad stations is desirable for example, for commuter passenger traffic and can even be absolutely necessary when the individual cars can only be entered or exited when the train stops at an absolutely specific point in the station (such as, for example, in St. Petersburg). This type of station has no actual platform but, rather, a track tunnel of the train is connected to a tunnel for waiting passengers only by individual small cross-connecting tunnels in front of whose end a respective car door of the stopped train is located in the track tunnel.

It is required given such a targeted braking that the automatic operational unit of the incoming train is informed at sufficiently close distances or time intervals about the locations at which the train is situated at the moment. For example, light barriers can be employed for this purpose, the automatic operational unit of the train receiving a signal when they are traversed. It is not only necessary in rugged rail operation, but also in the operation of trolleys and the like that the signal means have extraordinary ruggedness, durability and insensitivity to contamination. This is because the operating reliability and safety is critically dependent on the effectiveness of such route markings and their failure could lead to dangerous situations or even to serious accidents.

SUMMARY OF THE INVENTION

It is an object of the present invention to provide reliable and simply evaluatable route marking for use in a system for determining momentary location and velocity of rail-type vehicles.

In general terms the present invention is a system for identifying a momentary location and momentary velocity of a rail-bound vehicle. The vehicle has a transmission/evaluation means having an antenna for emitting a high-frequency pulse and for receiving a reflected pulse reply signal. Surface wave identification marks having individual coding are arranged at intervals from one another in an area of and along a prescribed travel path. A mutual phase shift of at least two pulse reply signals is measured as a Doppler shift and the travel velocity can be calculated therefrom via the relative velocity with pulse interrogations of an identification mark following one another at least twice at a location before/after traversing a specific identification mark. The point in time of the change in operational sign of the Doppler shift is acquired for this identification mark, this being the point in time of traversal of the prescribed location of the identification mark.

In a further development of the present invention, the exact path velocity is calculated for the known height of the motion path of the antenna of the transmission-/evaluation means, from the relative velocity measured at a location $X_1$, and from the chronological duration of the traversal of the distance $|X_1-X_0|$ between the locations $X_1$ and $X_0$, wherein $X_0$ is the location of the identification mark. The system is also useable for calculating location and velocity values for targeted braking of the vehicle.

The present invention is based on identification marks, what are referred to as ID tags. These identification marks for toll ticketing at toll stations of a motor highway system already employed in a system of Siemens AG in Oslo are suitable for being exactly identified in non-contacting fashion over a distance of meters. The ID tags are specific surface wave components.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

FIG. 3 depicts a pulse sequence in a pulse reply of an identification mark.

DESCRIPTION OF THE PREFERRED EMBODIMENT

Figure 2:
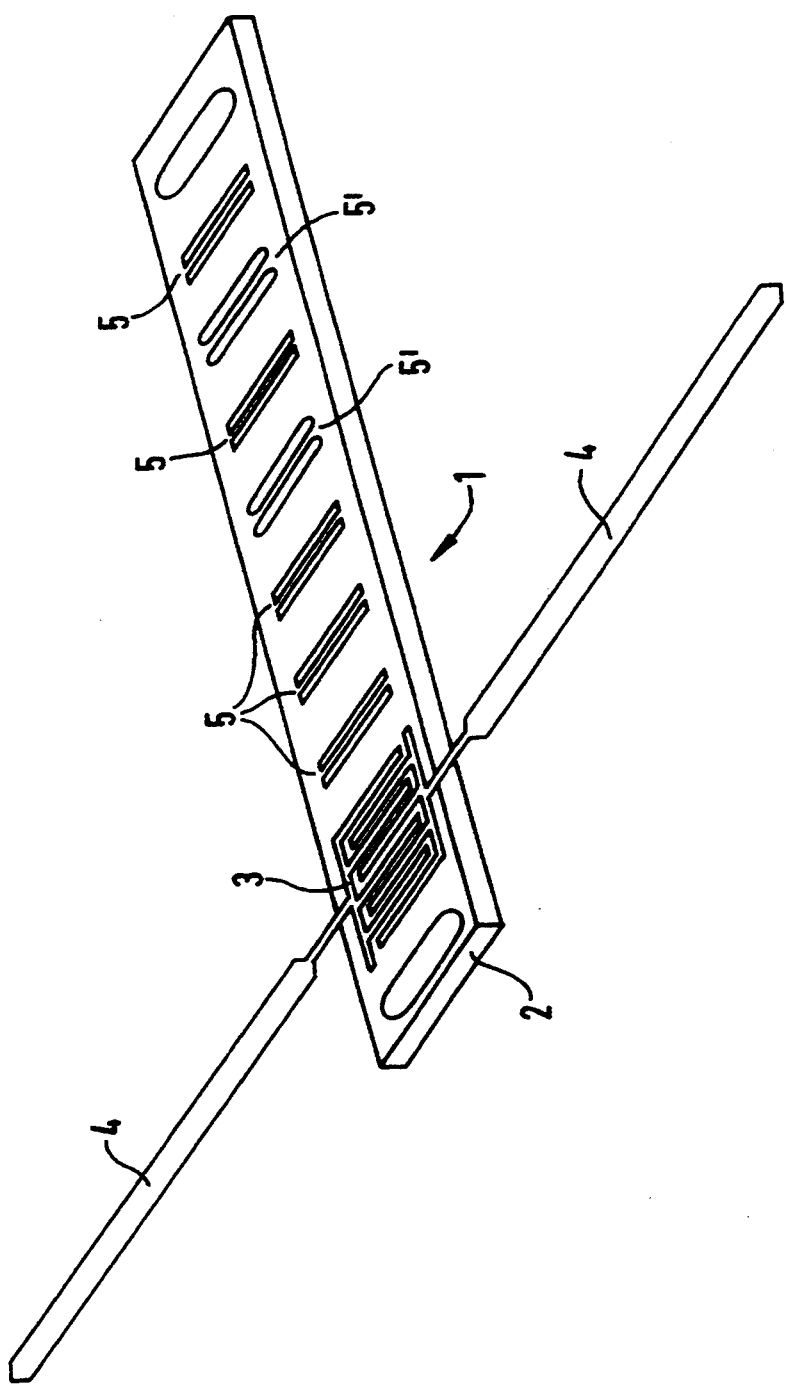
FIG. 2 is a perspective view of an identification mark.

FIG. 2 depicts an identification mark 1, which is a photolithographically applied stripe structure on the surface of a substrate member 2. The substrate member 2 is composed of highly piezoelectric coupling material such as lithium nitrate, lithium tantalate and the like. A part 3 of this stripe structure is an interdigital transducer to whose electrical terminals dipoles of the antenna 4 are connected. The stripe structure of the reflector 5 has locations that are isolated in omitted reflector strips, the distribution thereof in the reflector structure 5, to be more precise, forming the prescribable coding. In practice, such a reflector structure 5 has several hundred reflector strips arranged in a periodic sequence, resulting in a great number of coding possibilities. FIG. 3 shows the pulse sequence 10 (envelope) contained in the pulse reply of the identification mark 1 and is the reply of the coding of the reflector structure 5 to a received burst 11.

According to a feature of the present invention, such identification marks are installed at appropriate distances from one another preceding a stop location for the train in the track region or at the tunnel wall. Each and every identification mark of such a braking distance section has its own unique coding, that cannot be mistaken for the other identification marks of this section. For example, a train entering a station moves over this sequence of identification marks or moves along this sequence of identification marks. When moving past each of the identification marks, the automatic control system of the train knows exactly where the train is located at the moment or the exact localized point that has been reached at the moment.

A program for decelerating to a greater or lesser degree from one to another identification mark when, for example, entering the station can be calculated or, respectively, identified in advance from the operational data of the train. The program is selected such that the incoming train is continuously decelerated from full speed with a greatest possible rate of deceleration without the wheels of the railroad vehicle sliding on the rail. Sliding of the wheels on the rails would not only wear the surfaces of the wheels but, due to the indefiniteness of the sliding friction, the train would come to a standstill at a location completely different from the prescribed location.

It must be taken into consideration, however, that the respectively maximally obtainable rolling friction of the railroad wheel on the track can have different values, so that it cannot be assumed that an optimally short braking distance will be achieved in every instance. This indefiniteness is to be taken into consideration in the program for the braking in such a way that an anticipated, longer braking distance is assumed and an approximate maximum value of the coefficient of rolling friction at the moment and an anticipated value for the remainder of the braking distance is identified, for example, together with the braking in a first section of the entire retardation path. The braking, for example, can then ensue automatically with a correspondingly modified program. It is even more beneficial to make the predictive estimates according to the rules of fuzzy logic from values already measured at the moment and to achieve, if not the optimum program, nonetheless an approximate optimum of the braking.

Each and every individual identification mark can be unambiguously recognized proceeding from the moving train with the assistance of the aforementioned identification marks in the track or, respectively, tunnel region close to the moving train and on the basis of the coding of these identification marks. As a result, the momentary position of the moving train is known. Over and above this, however, the speed of the train can also be exactly identified above ground with high precision with the assistance of the identification marks, namely free of any and all imprecisions that caused by slippage and that are unavoidable when measuring the travel speed from the circumferential velocity of the rolling wheel. On the contrary, an immediate determination as to whether slippage of the rolling wheel is presently occurring can be made from the speed which has been exactly identified using the identification marks. The speed calculated with the rolling wheel merely has to be compared to the exactly measured value and the difference derives as slippage.

The present invention, however, can be utilized not only in railroad operations but can also be employed in other comparable transportation means. To this extent, the specification for the implementation of the present invention set forth below can also be transferred without further ado to such comparable cases.

The inventively applied evaluation method provides that burst pulses 11 having an appropriately high carrier frequency are output by a pulse transmitter. This burst pulse is picked up by the surface wave structure 3, 5 of the identification mark 1 via the antenna 4 of the identification mark 1 and is converted by the latter into a characteristic pulse reply signal 10. The characteristic of the pulse reply signal 10 is dependent upon the selected structure of the reflector 5 of the identification mark. The pulse reply signal 10 that is transmitted back to the evaluation means by the identification mark contains further information in addition to containing the coding of the reflector. Since the pulse transmission and pulse reply evaluation means attached to the moving train approaches the identification mark with the velocity of the train, a Doppler frequency shift of the carrier frequency of the pulse reply signal occurs (from which the relative speed between the train and the respective identification mark can be calculated). The absolute speed of the train can be immediately calculated from the measured relative speed, namely without any slippage error, with the known, structurally conditioned attitudinal positions of the identification mark in the track region or at the tunnel wall on the one hand and of the place of application of the transmission/evaluation means at the train, on the other hand.

The exact moment at which the train travels past the respective identification mark as route mark can be identified from the curve of the measured Doppler frequency shift. The zero-axis crossing of the Doppler frequency shift is the location of the route mark.

The Doppler shift can be identified and evaluated as a frequency shift or (given correspondingly small values) as a phase shift relative to a reference phase.

The present invention is thus directed to those measures for determining the curve of the relative speed between the identification/route mark and the transmission/reception antenna of the transmission/evaluation means from the Doppler frequency/phase shift of the carrier frequency of the pulse reply signal or of a part thereof and of thus identifying both the true speed as well as the exact position of the train (or of some other vehicle). The coincidence of the position of the train with the position identified by the identification mark is acquired using the zero-axis crossing of the Doppler frequency/phase shift of the carrier frequency of the reply signal (or of a part thereof). The distance between the transmission/reception antenna for the pulse reply signal mechanically coupled to the train and the identification mark when traveling past the latter can likewise be calculated from the Doppler frequency/phase shift (if this value is not already known). When this distance value is known, the reliability and precision of the inventive system can be checked at any time from the coincidence of the measured value and the known value on the basis of a measurement thereof as set forth above. The exact lay of the position of the identification mark as a route mark relative to the train is calculated from the relationship between the speed of the train and its relative speed. The direction of the respective connecting line between the identification mark and the transmission/reception antenna of the evaluation means derives at any location of the motion path from these two speeds. The location of the route mark derives as a intersection of this connecting line proceeding from various positions of the train, i.e. positions of the transmission/reception antenna. In particular, this location also derives from the intersection of one of these connecting lines with the above-described perpendicular or with the straight line proceeding parallel to the travel path that the aforementioned perpendicular distance between antenna and mark has when traveling therepast. Conversely, the distance between the identification mark can be calculated as the intersection of the above connecting lines.

Figure 1:
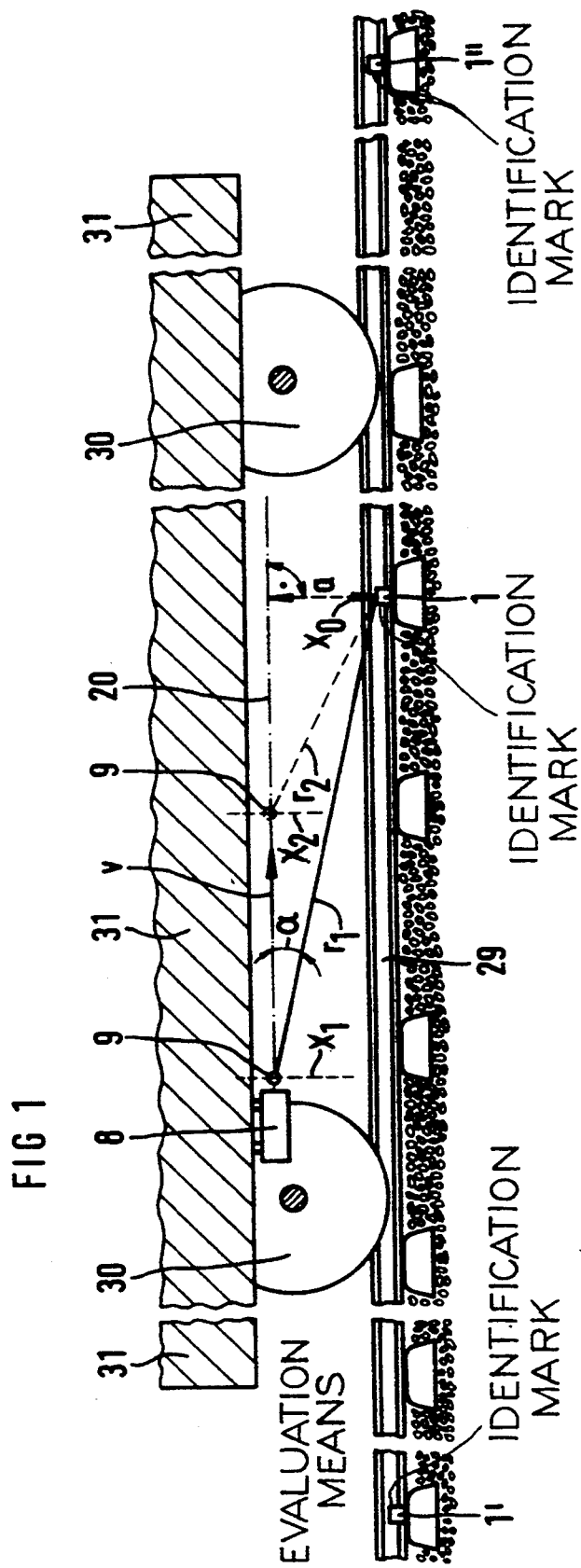
FIG. 1 is a sectional view showing identification marks in a track region for a rail vehicle.

The sectional view of FIG. 1 is attached for illustrating these geometrical conditions. This figure shows the identification mark 1 that is interrogated as a route mark in the track region. FIG. 1 also depicts the rail 29 and a car wheel 30. Further identification marks are route marks 1', 1". There can be no mistaken identities because each of the identification marks outputs its own coded, that is unmistakable, pulse reply signal upon interrogation.

Corresponding to the travel path of the car 31 having the wheels 3, the transmission/reception antenna 9 of the evaluation means 8 moves on the travel path 20 parallel to the rail 29. The perpendicular distance, i.e. the distance between antenna 9 and identification mark 1 when traveling therepast is referenced "a". When, at the moment of the illustrated position of the antenna 9 relative to the identification mark 1, an interrogation pulse is transmitted, then a relative velocity $V_{rel}$ corresponding to the connecting ray $r_1$ derives as Doppler shift velocity. This velocity value is measured as frequency or phase shift between at least two interrogated and received pulse reply signals that follow one another in a short time. The angle $\alpha$ is the directional angle of the connecting line $r_1$. When this, which occurred at location $x_1$ repeats at location $x_2$, the relative velocity $V_{rel2}$ for the connecting line $r_2$ is obtained. The correspondingly diminished relative velocity thereby derives and the relative velocity is zero at points $x_0$. This effect is utilized for identifying the location $x_0$ and the point in time at which the identification mark 1 is traversed.

The coding of the identification mark employed as route marks contains the respectively allocated position number in the sequence of a plurality of route marks arranged at intervals from one another. Such a sequence of route marks is preferably provided in the braking area preceding a station. Such route marks, however, can also be provided elsewhere on the path, for example, in order to merely measure the speed of the train without slippage. As mentioned, the identification marks with surface wave structures employed as route mark are passive components that require no power supply whatsoever. Their range of operation is relatively limited, but this is an advantage in the present case, because it substantially precludes disturbing influences from the environment.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. A system for identifying momentary location and the momentary velocity of a rail-bound vehicle, comprising:
    a transmission/evaluation means having an antenna for emitting a high-frequency pulse and for receiving a reflected pulse reply signal arranged on the vehicle;
    surface wave identification marks having individual coding and arranged at intervals from one another in an area of and along a prescribed travel path of the vehicle;
    the transmission/evaluation means having means for measuring a mutual phase shift of at least two received pulse reply signals as a Doppler shift and having means for calculating a travel velocity therefrom via a relative velocity with pulse interrogations of a respective identification mark following one another at least twice at a predetermined location before/after traversing said respective identification mark; and
    having means for acquiring a point in time of a change in operational sign of the Doppler shift for said respective identification mark, said point in time of said change in operational sign being a point in time of traversal of a location of the respective identification mark.

2. The system according to claim 1, wherein the transmission/evaluation means has means for calculating an exact path velocity for a known height of a motion path of the antenna of the transmission/evaluation means, from the relative velocity measured at the predetermined location, and from a chronological duration of traversal of a distance between the predetermined location and the location of the respective identification mark.

3. The system according to claim 1, wherein the transmission/evaluation means has means for calculating location and velocity values for targeted braking of the vehicle.

4. A system for determining momentary location and momentary velocity of a rail-bound vehicle, comprising:
    surface wave identification marks, having individual coding, spaced from one another along a travel path of the rail-bound vehicle;
    an evaluation means for emitting at least one high frequency burst pulse and for receiving at least one reflected pulse reply signal, said evaluation means being arranged on the rail-bound vehicle;
    said evaluation means having means for determining at least two respective Doppler frequency shifts of said respective burst pulses and said respective reply signals and for determining a momentary velocity of the vehicle from the frequency shift between said at least two Doppler frequency shifts;
    said evaluation means having means for determining a zero-axis crossing of the Doppler frequency shifts, said zero-axis crossing being indicative of the vehicle directly passing said respective surface wave identification mark thereby establishing a momentary location of the vehicle.

5. A method for determining momentary location and momentary velocity of a rail-bound vehicle, comprising the steps of:
    providing surface wave identification marks, having individual coding, spaced from one another along a travel path of the rail-bound vehicle;
    proving an evaluator for emitting at least one high frequency burst pulse, for receiving at least one reflected pulse reply signal, and for evaluating said at least one reply signal, said evaluator being arranged on the rail-bound vehicle;
    emitting at least two burst pulses toward a respective surface wave identification mark while the rail-bound vehicle is moving;
    receiving at least two respective reply signals from said respective surface wave identification mark;
    determining at least two respective Doppler frequency shifts of said respective burst pulses and said respective reply signals, and determining a momentary velocity of the vehicle from a frequency shift between said at least two Doppler frequency shifts; and
    determining a zero-axis crossing of the Doppler frequency shifts, said zero-axis crossing being indicative of the vehicle directly passing said respective surface wave identification mark thereby establishing a momentary location of the vehicle.

* * * * *